(12) United States Patent
Sievers et al.

(10) Patent No.: US 11,110,548 B2
(45) Date of Patent: Sep. 7, 2021

(54) METHODS AND APPARATUS FOR LASER DEPOSITION

(71) Applicant: The Boeing Company, Chicago, IL (US)

(72) Inventors: Daniel E. Sievers, Owens X roads, AL (US); Peter J. Bocchini, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 16/101,371

(22) Filed: Aug. 10, 2018

(65) Prior Publication Data
US 2020/0047287 A1 Feb. 13, 2020

(51) Int. Cl.
*B23K 26/34* (2014.01)
*B23K 26/342* (2014.01)
(Continued)

(52) U.S. Cl.
CPC ........... *B23K 26/342* (2015.10); *B22F 3/105* (2013.01); *B22F 12/00* (2021.01); *B23K 26/0093* (2013.01); *B23K 26/123* (2013.01); *B23K 26/1464* (2013.01); *B29C 64/153* (2017.08); *B29C 64/209* (2017.08); *B29C 64/268* (2017.08); *B29C 64/371* (2017.08); *B33Y 10/00* (2014.12); *B33Y 30/00* (2014.12);
(Continued)

(58) Field of Classification Search
CPC ............... B23K 26/342; B23K 26/093; B23K 26/0093; B23K 26/123; B23K 26/146; B33Y 10/00; B33Y 30/00; B33Y 40/00; B29C 64/153; B29C 64/209; B29C 64/268; B29C 64/371
See application file for complete search history.

(56) References Cited

U.S. PATENT DOCUMENTS 3,754,976 A * 8/1973 Babecki ................. C23C 24/04
427/192
5,126,529 A * 6/1992 Weiss
(Continued)

FOREIGN PATENT DOCUMENTS

| CA | 3014855 A1 | 8/2017 |
|---|---|---|
| EP | 0529816 A1 | 3/1993 |
| GB | 2533102 A | 6/2016 |

OTHER PUBLICATIONS

Sealy et al., Hybrid Processes ion Additive Manufacturing, Journal of Manufacturing Science and Engineering Jun. 2018, vol. 140 (Year: 2018).*
(Continued)

*Primary Examiner* — Peter Radkowski (57) ABSTRACT

A laser deposition apparatus includes a sealed enclosure configured to hold a substrate, a powder source configured to hold a powder material, a peen source configured to hold a shot peen media, and a deposition system fluidly connected to the powder source and the peen source. The deposition system includes a laser configured to generate a laser beam. The deposition system is configured to deposit at least one layer on the substrate by injecting a stream of the powder material into the laser beam. The deposition system is configured to shot peen the at least one layer by propelling the shot peen media onto an exterior surface of the at least one layer.

20 Claims, 9 Drawing Sheets

(51) Int. Cl.
*B33Y 10/00* (2015.01)
*B33Y 30/00* (2015.01)
*B33Y 40/00* (2020.01)
*B29C 64/153* (2017.01)
*B29C 64/209* (2017.01)
*B29C 64/268* (2017.01)
*B29C 64/371* (2017.01)
*B23K 26/00* (2014.01)
*B23K 26/12* (2014.01)
*B23K 26/14* (2014.01)
*B22F 3/105* (2006.01)
*B22F 12/00* (2021.01)
*B22F 3/24* (2006.01)
*B22F 7/00* (2006.01)
*B22F 10/10* (2021.01)

(52) U.S. Cl.
CPC ............... *B33Y 40/00* (2014.12); *B22F 3/24* (2013.01); *B22F 7/006* (2013.01); *B22F 10/10* (2021.01)

(56) References Cited

U.S. PATENT DOCUMENTS

| | | | | |
|---|---|---|---|---|
| 5,207,371 | A * | 5/1993 | Prinz | |
| 9,254,550 | B2 * | 2/2016 | Haverty | |
| 9,938,624 | B2 * | 4/2018 | Nardi | C23C 24/04 |
| 10,220,473 | B2 * | 3/2019 | Ohno | B33Y 40/00 |
| 10,226,917 | B2 * | 3/2019 | Hyatt | B33Y 10/00 |
| 10,384,264 | B2 * | 8/2019 | Daum | B28B 1/001 |
| 10,427,247 | B2 * | 10/2019 | Wescott | B23K 35/0244 |
| 10,614,923 | B2 * | 4/2020 | Van Rooyen | G21C 3/626 |
| 2010/0211158 | A1 * | 8/2010 | Haverty | B24C 1/10 623/1.15 |
| 2015/0041025 | A1 * | 2/2015 | Wescott | B23K 26/0622 148/538 |
| 2016/0207108 | A1 * | 7/2016 | Daum | B29C 64/209 |
| 2016/0237573 | A1 * | 8/2016 | Nardi | B32B 15/01 |
| 2016/0355904 | A1 * | 12/2016 | Achuthan | B23K 26/0093 |
| 2017/0028631 | A1 * | 2/2017 | Hyatt | B05B 7/1468 |
| 2017/0259377 | A1 * | 9/2017 | Ohno | B23K 26/144 |
| 2017/0259378 | A1 * | 9/2017 | Ohno | B23K 26/1435 |
| 2018/0025797 | A1 * | 1/2018 | Van Rooyen | G21C 3/626 376/416 |
| 2020/0047287 | A1 * | 2/2020 | Sievers | B33Y 30/00 |
| 2020/0251233 | A1 * | 8/2020 | van Rooyen | G21C 3/044 |

OTHER PUBLICATIONS

DebRoy et al., Additive manufacturing of metallic components—Process, structure and properties, Progress in Materials Science 92 (2018) 112-224 (Year: 2018).*

"Search Report Issued in European Patent Application No. 19182469. 7", dated Oct. 11, 2019, 10 Pages.

Boisselier, et al., "Improvement of the laser direct metal deposition process in 5-axis configuration," In Proceedings of 8th International Conference on Photonic Technologies LANE 2014, Published in Physics Procedia, Elsevier, Amsterdam, NL, vol. 56, Sep. 9, 2014, pp. 239-249.

\* cited by examiner

METHODS AND APPARATUS FOR LASER DEPOSITION

BACKGROUND

Additive manufacturing processes are currently used for producing a wide variety of three dimensional (3D) objects. Additive manufacturing includes depositing one or more layers of material, for example to fabricate an object, to clad an existing object, or to repair the existing structure of an object. One example of an additive manufacturing process is laser deposition technology (LDT), wherein a powder material is sprayed into a laser beam to thereby melt the powder and deposit a layer. The LDT process can be repeated to successively deposit a plurality of layers on a substrate and thereby build an object, sometimes referred to as laser freeform manufacturing technology (LFMT). Other examples of using LDT processes include laser cladding technology (LCT) wherein an existing object is clad with one or more cladding layers, and laser repair technology (LRT) which includes depositing one or more layers on an existing object to repair the structure of the object.

Additively manufactured objects can have lower fatigue strength as compared to objects manufactured using other processes, for example due to grain size, microstructure, crystallographic text, surface finish, etc. Accordingly, objects that have been additively manufactured using processes such as laser deposition are sometimes surface treated with a shot peening process (or other processes) to improve fatigue strength. But, current shot peening processes (and other processes) are performed at a secondary station after the additive manufacturing process is complete, which can be inefficient, time-consuming, and/or costly. Moreover, it can be difficult to reach surfaces of the object that have limited or no exposure after the additive manufacturing process is complete, particularly with objects having complex shapes.

A need exists for a more efficient, less time consuming, less costly, and/or more accurate shot peening process for additively manufactured objects.

SUMMARY

With those needs in mind, certain embodiments of the present disclosure provide a laser deposition apparatus that includes a sealed enclosure configured to hold a substrate, a powder source configured to hold a powder material, a peen source configured to hold a shot peen media, and a deposition system fluidly connected to the powder source and the peen source. The deposition system includes a laser configured to generate a laser beam. The deposition system is configured to deposit at least one layer on the substrate by injecting a stream of the powder material into the laser beam. The deposition system is also configured to shot peen the at least one layer by propelling the shot peen media onto an exterior surface of the at least one layer.

In at least one embodiment, the deposition system further includes a deposition head fluidly connected to the powder source and the peen source. The deposition head is configured to spray the stream of powder material into the laser beam. The deposition head is configured to spray the shot peen media onto the exterior surface of the at least one layer.

In one or more embodiments, the deposition system further includes first and second deposition heads. The first deposition head is fluidly connected to the powder source and is configured to spray the stream of powder material into the laser beam. The second deposition head is fluidly connected to the peen source and is configured to spray the shot peen media onto the exterior surface of the at least one layer.

In one or more embodiments, the deposition system further includes a deposition head fluidly connected to the powder source and the peen source. The deposition head includes first and second nozzles. The first nozzle is fluidly connected to the powder source and is configured to spray the stream of powder material into the laser beam. The second nozzle is fluidly connected to the peen source and is configured to spray the shot peen media onto the exterior surface of the at least one layer.

Certain embodiments of the present disclosure provide a method for laser deposition that includes depositing at least one layer of material on a substrate by injecting a stream of powder material from a powder source into a laser beam using a deposition system that is connected to the powder source and is connected to a peen source. The method also includes shot peening the at least one layer by using the deposition system to propel a shot peen media from the peen source onto an exterior surface of the at least one layer.

Certain embodiments of the present disclosure also provide a deposition system that includes a laser configured to generate a laser beam, and at least one deposition head configured to be fluidly connected to a powder source that contains a powder material and a peen source that contains a shot peen media. The at least one deposition head is configured to deposit at least one layer of material by injecting a stream of the powder material from the powder source into the laser beam. The at least one deposition head is also configured to shot peen the at least one layer by propelling the shot peen media from the peen source onto an exterior surface of the at least one layer.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain embodiments of the present disclosure include a laser deposition apparatus configured to deposit at least one layer on a substrate by injecting a stream of powder material into a laser beam. The deposition system is further configured to shot peen the at least one layer by propelling the shot peen media onto an exterior surface of the at least one layer. As a result of the at least one layer (or an object formed therefrom) not having to be moved to another device to perform the peening operation, the laser deposition process is more efficient, less time consuming, and/or less costly. Additionally, a more accurate shot peening process for additively manufactured objects can result.

Figure 1:
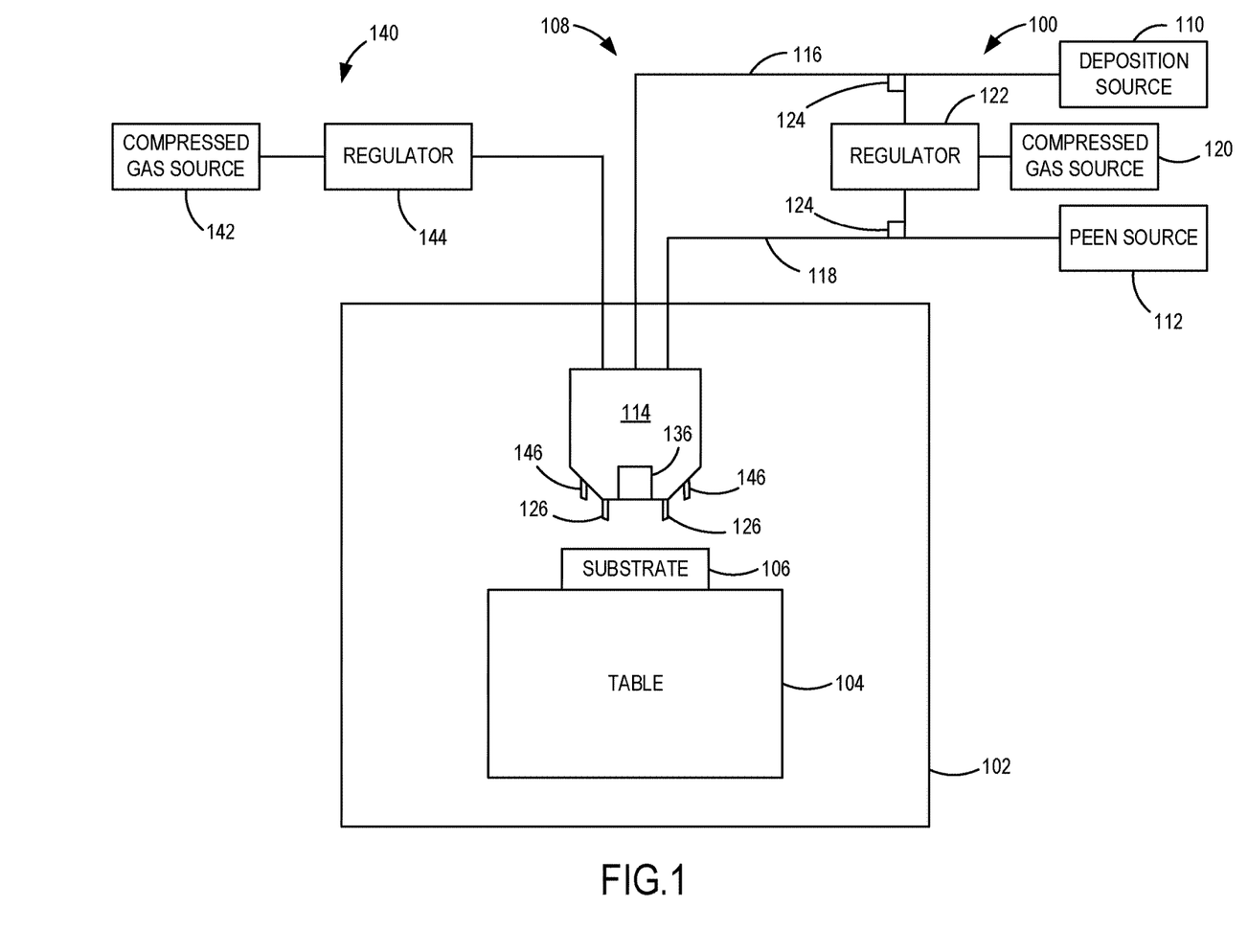
FIG. 1 is a schematic diagram of a laser deposition apparatus according to an embodiment of the present disclosure.

FIG. 1 is a block diagram of a laser deposition apparatus 100 according to an embodiment of the present disclosure. The laser deposition apparatus 100 is configured to additively manufacture an object by depositing one or more layers of material on a substrate or an existing object. For example, the laser deposition apparatus 100 can be used to fabricate an object. In one example, the laser deposition apparatus 100 is a powder-fed laser deposition apparatus, but other laser deposition processes are used in other examples (e.g., a liquid-fed laser deposition apparatus, etc.). The exemplary embodiment of the laser deposition apparatus will be described and illustrated herein with respect to fabricating an object, which is sometimes referred to as laser freeform manufacturing (LFM). But, the laser deposition apparatus 100 also can be used to clad an existing object with a cladding material, to repair the structure of an existing object, and/or the like.

The laser deposition apparatus 100 includes a sealed enclosure 102 and a table 104 held within the sealed enclosure 102. The sealed enclosure 102 is hermetically sealed and contains an inert gas, for example argon (Ar), helium (He), etc. In some examples, the oxygen level within the sealed enclosure 102 is kept below a minimum level (e.g., below five parts per million (ppm), etc.). Optionally, the sealed enclosure 102 includes an antechamber (not shown) for passing objects to and from the sealed enclosure 102.

The table 104 is configured to hold a substrate 106 for depositing one or more layers of material on the substrate 106 to thereby build (i.e., fabricate) an object on the substrate 106. In addition or alternatively, the table 104 is configured to hold an existing object (not shown) for cladding, repairing, and/or the like, as described above. Optionally, the table 104 is moveable such that the table 104 is configured to change the orientation of the substrate 106 (or an existing object held on the table 104), for example to facilitate shot peening the object.

As will be described in more detail below, the laser deposition apparatus 100 of the present disclosure includes a deposition system 108 that is configured to deposit one or more layers of a material on the substrate 106 to thereby fabricate (or in other examples clad, repair, and/or the like) an object. The deposition system 108 is also configured to shot peen an exterior surface of the deposited layer(s) to thereby apply a surface treatment to the object built from the deposited layer(s). As used herein, a "substrate" (e.g., the substrate 106) is, for example, a surface or material on which one or more layers is deposited to fabricate an object and can also be used to refer to an existing object on which one or more layers are deposited for cladding, repairing, and/or the like.

The laser deposition apparatus 100 includes a deposition source, which in the illustrated embodiment is a powder source 110, that holds a powder deposition material that is deposited on the substrate 106 to build the object (i.e., the material that composes the resulting object). It should be noted that while the material held by the powder source 110 in one example is a powder material, other material may be used. For example, other deposition sources that can be used hold a material in any other form that enables one or more layers of the material to be deposited (e.g., a liquid, etc.). Examples of materials that can be used to fabricate the object (or in other embodiments clad, repair, etc. the object) include, but are not limited to, a metal, a composite metal, another composite material, a plastic, an epoxy, and/or the like. Although only one is shown, the laser deposition apparatus 100 can include any number of deposition sources.

The laser deposition apparatus 100 includes a peen source 112 that holds a shot peen media that is propelled onto an exterior surface of the object to thereby apply a surface treatment to the object. Examples of shot peen media used to surface treat the object include, but are not limited to, a metal, a composite metal, another composite material, cast steel, a plastic, sand, glass, and/or the like. The shot peen media held by the peen source 112 has any size that enables the deposition system 108 to surface treat the object, such as, but not limited to, a media size of 930 per Table 1 of AMS2430, a media size of 930ASH per AMS2431/2, and/or the like. In one example, the nominal size of the shot peen media used on fillet surfaces is no larger than ½ the smallest fillet radius occurring within the area being shot peened. In another example, a CW-32 or cast 280 size or smaller is used for shot peening forging flash and/or casting parting line extension radii of about 0.04 inches or greater. In one example wherein the shot peen media passes through into a recess and/or through an opening of the object, the nominal diameter of the shot peen media is not greater than about 25% of the width of the recess and/or opening. Although only one is shown, the laser deposition apparatus 100 can include any number of shot peen sources 112.

In one example of the laser deposition apparatus 100, the deposition system 108 includes a single deposition head 114 that is fluidly connected to both the powder source 110 and the peen source 112 via conduits 116 and 118, respectively. The fluid connections of the deposition head 114 to the sources 110 and 112 enable the deposition head 114 to build the object using the powder material and to shot peen the object using the shot peen media, respectively. The deposition head 114 will be described in more detail below with reference to FIG. 2.

The deposition system 108 includes one or more compressed gas sources 120 (a single compressed gas source 120 is shown). The compressed gas source 120 drives operation of the deposition head 114. For example, the compressed gas source 120 is fluidly connected to the conduit 116 such that the compressed gas source 120 is configured to move powder material from the powder source 110 to the deposition head 114 to enable the deposition head 114 to spray the powder material. Similarly, the compressed gas source 120 is fluidly connected to the conduit 118 such that the compressed gas source 120 is configured to move shot peen media from the peen source 112 to the deposition head 114 to enable the deposition head 114 to spray the shot peen media.

The deposition system 108 includes one or more regulator assemblies 122 (one regulator assembly 122 is shown) that are configured to regulate the gas pressure released from the compressed gas source 120 into the conduits 116 and 118 to thereby regulate the intensity of the spray from the deposition head 114. The regulator assembly 122 also includes one or more valves 124 that selectively switch the deposition system 108 between fluid connection with the powder source 110 and the peen source 112. For example, the valve 124 includes a position wherein the deposition head 114 is fluidly connected to the powder source 110 and the corresponding conduit 116 is fluidly connected to the compressed gas source 120 such that the deposition head 114 is configured to spray powder material from the powder source 110. The valve 124 includes another position wherein the deposition head 114 is fluidly connected to the peen source 112 and the corresponding conduit 118 is fluidly connected to the compressed gas source 120 such that the deposition head 114 is configured to spray shot peen media from the peen source 112.

Any compressible gas can be held by the compressed gas source 120 and used to drive operation of the deposition head 114, such as, but not limited to, air, an inert gas, and/or the like. Although shown and described as having only a single compressed gas source 120 for enabling the deposition head 114 to spray both powder material from the powder source 110 and shot peen media from the peen source 112, the deposition system 108 can include any number of compressed gas sources 120. In one other example, the deposition system 108 includes two compressed gas sources 120, namely a compressed gas source dedicated to the powder source 110 for enabling the deposition head 114 to spray powder material from the powder source 110 and a compressed gas source dedicated to the peen source 112 for enabling the deposition head 114 to spray shot peen media from the peen source 112.

Figure 2:
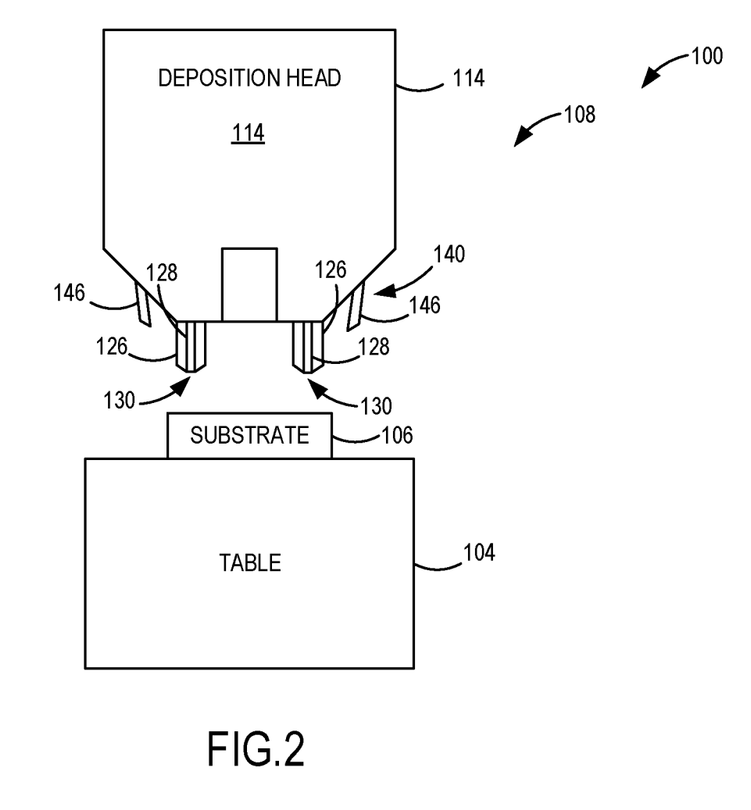
FIG. 2 is an enlarged schematic diagram of a deposition system of the laser deposition apparatus shown in FIG. 1 according to an embodiment of the present disclosure.

Referring now to FIG. 2, the deposition head 114 includes one or more nozzles 126. Each nozzle 126 includes a channel 128 having an outlet 130 that is configured to spray a stream of powder material (e.g., the stream of powder material 132 shown in FIG. 3) and/or a stream of shot peen media (e.g., the stream of shot peen media 134 shown in FIG. 4) therefrom. The outlet 130 of each nozzle 126 has any shape that enables the nozzle 126 to generate a spray pattern that enables the laser deposition apparatus to function as descried and/or illustrated herein. The channel 128 of each nozzle 126 is fluidly connected to one or both of the conduits 116 and 118 (shown in FIG. 1) for spraying powder material from the powder source 110 (shown in FIG. 1) and/or spraying shot peen media from the peen source 112 (shown in FIG. 1). In the illustrated example of the deposition head 114, the channel 128 of each nozzle 126 is fluidly connected to both conduits 116 and 118 such that each nozzle 126 is configured to selectively spray a stream of powder material from the powder source 110 and spray a stream of shot peen media from the peen source 112. In other examples, one or more nozzles 126 are dedicated spraying powder material from the powder source 110 and/or one or more nozzles 126 are dedicated to spraying shot peen media from the peen source 112. For example, one or more of the nozzles 126 are fluidly connected only to the conduit 116 of the powder source 110 such that the nozzle(s) 126 is configured only to spray powder material, while one or more other nozzles 126 are fluidly connected only to the conduit 118 of the peen source 112 such that the nozzle(s) 126 is configured only to spray shot peen media. Although two are shown, the deposition head 114 can include any number of nozzles 126. Each nozzle 126 are referred to herein in various examples as a "first" and/or a "second" nozzle.

Figure 3:
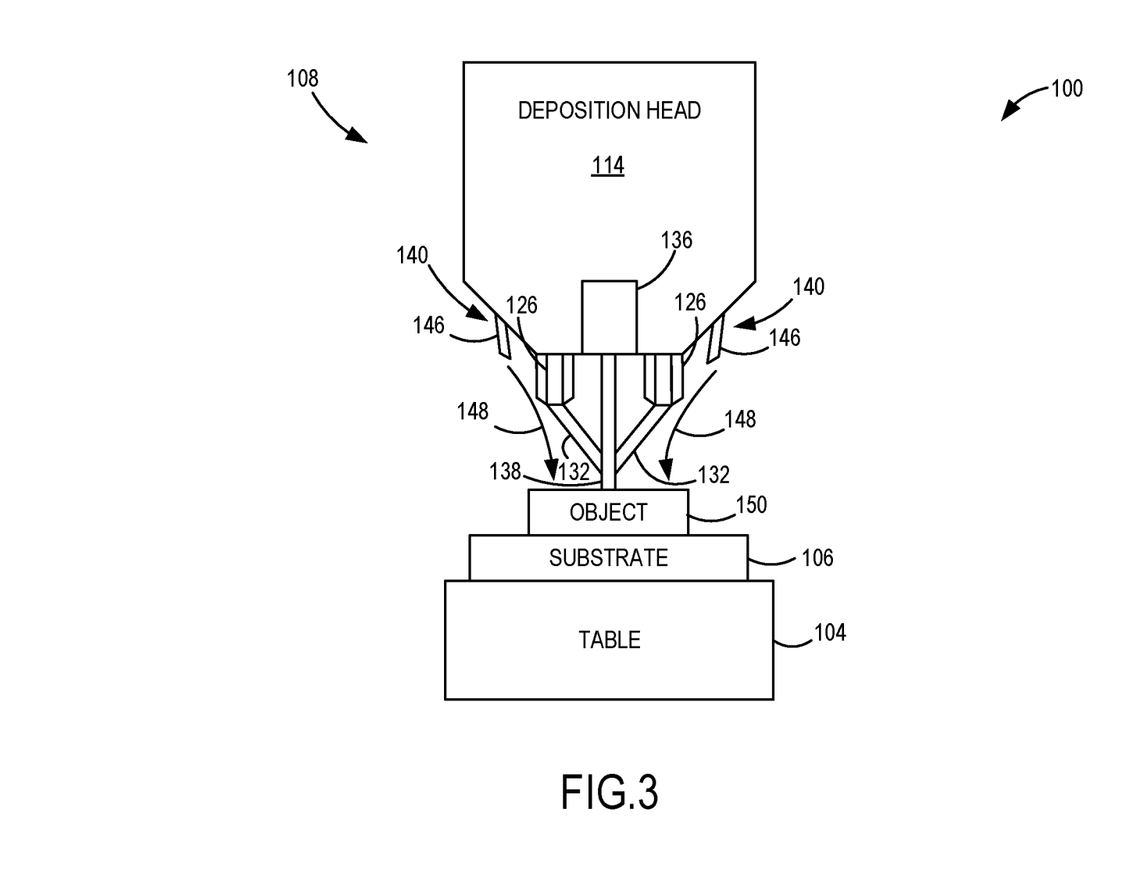
FIG. 3 is an enlarged schematic diagram of the deposition system shown in FIG. 2 illustrating a deposition operation according to an embodiment of the present disclosure.

In the illustrated example of the deposition system 108, the deposition head 114 includes a laser 136 that is configured to generate a laser beam (e.g., the laser beam 138 shown in FIG. 3). In some examples, the laser beam generated by the laser 136 is a focused laser beam. As will be described below with reference to FIG. 3, the outlets 130 of any of the nozzles 126 that are configured to spray powder material from the powder source 110 are positioned relative to the laser beam such that the nozzle 126 sprays the stream of powder material into the laser beam to thereby melt the powder material and deposit a layer of material on the substrate 106. The laser 136 generates a laser beam having any power and/or intensity that enables the deposition system 108 to function as described and/or illustrated herein, Although shown as being a component of the deposition head 114, in other examples the laser 136 is a separate component of the deposition system 108 that is positioned relative to the deposition head 114 such that the laser beam generated by the laser 136 is configured to receive a stream of powder material from the deposition head 114.

In some examples, the deposition system 108 includes a control gas sub-system 140 as illustrated in FIGS. 1 and 2. The control gas sub-system 140 facilitates protecting the reaction between the powder material and the laser beam, for example by containing the reaction to the area where the stream of powder and the laser beam intersect. The control gas sub-system 140 includes a compressed gas source 142 (not shown in FIG. 2), a regulator assembly 144 (not shown in FIG. 2), and one or more nozzles 146. The nozzles 146 are positioned to spray a stream of the control gas (e.g., the stream of control gas 148 shown in FIG. 3) that at least partially surrounds the stream of powder material to thereby facilitate protecting the reaction between the powder material and the laser beam. The stream(s) of control gas emitted by the control gas sub-system 140 also help control the size, shape, direction, geometry, and/or the like of the stream of powder material in some examples to facilitate depositing the layer(s) of material on the substrate 106 in a manner that provides the resulting object with the predetermined size, shape, geometry, and/or the like. Optionally, the control gas sub-system is used during shot peening of the object to facilitate controlling the size, shape, direction, geometry, and/or the like of the stream of shot peen media. The stream of control gas generated by the control gas sub-system 140 is any inert gas, for example argon (Ar), helium (He), etc.

In the exemplary embodiment of the deposition system 108, the nozzles 146 of the control gas sub-system 140 are shown as being a component of the deposition head 114. But, in other examples one or more of the nozzles 146 are a separate component of the deposition system 108 that is positioned relative to the deposition head 114 to enable the control gas sub-system 140 to function as described and/or illustrated herein.

In operation, and referring now to FIG. 3, a laser deposition process is shown wherein the laser 136 emits a laser beam 138 toward the substrate 106. The nozzles 126 of the deposition head 114 spray a stream of powder material 132 from the powder source 110 (shown in FIG. 1) such that the stream of powder material 132 is injected into the laser beam 138. The laser beam 138 melts the powder material such that a layer of material is deposited on the substrate 106. The deposition process is repeated layer by layer to build an object 150 on the substrate 106. During the deposition process, the nozzles 146 of the control gas sub-system 140 spray a stream of control gas 148 that at least partially surrounds the stream of powder material 132 to facilitate protecting the reaction between the powder material and the laser beam 138. FIG. 3 illustrates an intermediary stage of the deposition process wherein the build of the object 150 is only partially completed.

Figure 4:
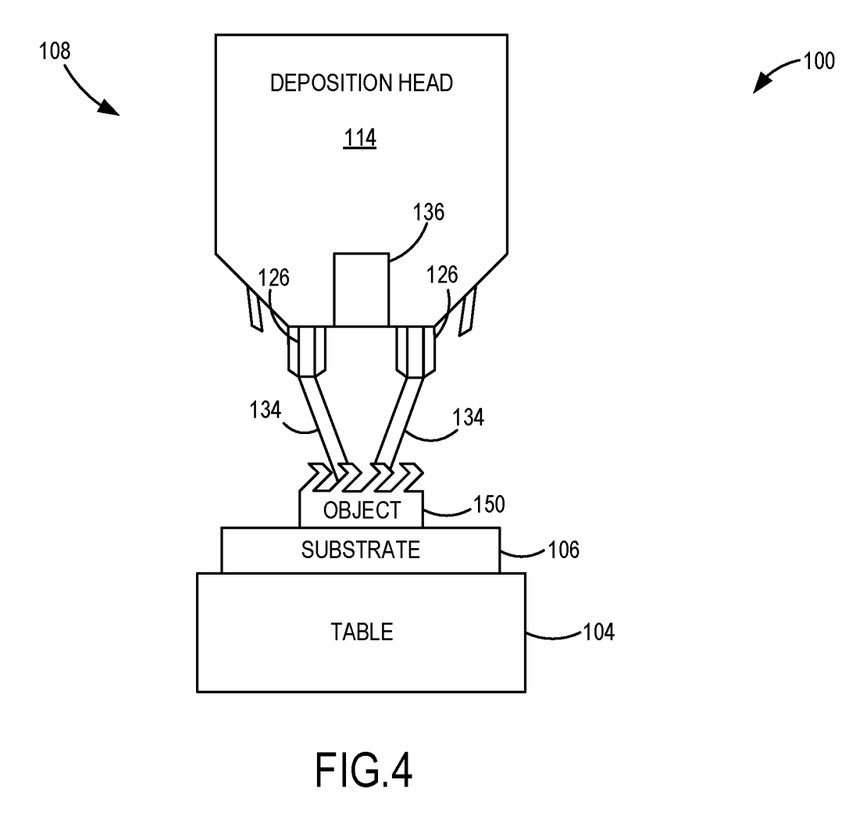
FIG. 4 is an enlarged schematic diagram of the deposition system shown in FIG. 2 illustrating a shot peening operation according to an embodiment of the present disclosure.

Referring now to FIG. 4, the structure of the object 150 is shown as having been completely built from the deposition process shown in FIG. 3. The object 150 shown herein is meant as an example only. The object 150 can have any other size, shape, geometry, and/or the like than is shown herein. FIG. 4 illustrates a shot peening operation that is performed on the completed object 150 by the laser deposition apparatus 100. The nozzles 126 of the deposition head 114 spray (e.g., propel) a stream of shot peen media 134 from the peen source 112 (shown in FIG. 1) onto exterior surfaces of the object 150 to thereby surface treat the object 150. The shot peen media 134 is sprayed onto the exterior surfaces of the object 150 at any intensity that enables the laser deposition apparatus 100 to surface treat the object 150.

Optionally, the table 104 and/or the deposition head 114 is moved to change the orientation of the object 150 and thereby increase coverage of the shot peen media. For example, changing the orientation of the object 150 enables the shot peen media to impact exterior surfaces of the object 150 that have limited exposure after the structure of the object 150 has been completed by the laser deposition process (e.g., surfaces of crevices, recesses, under openings, under overhangs, etc.).

Figure 5:
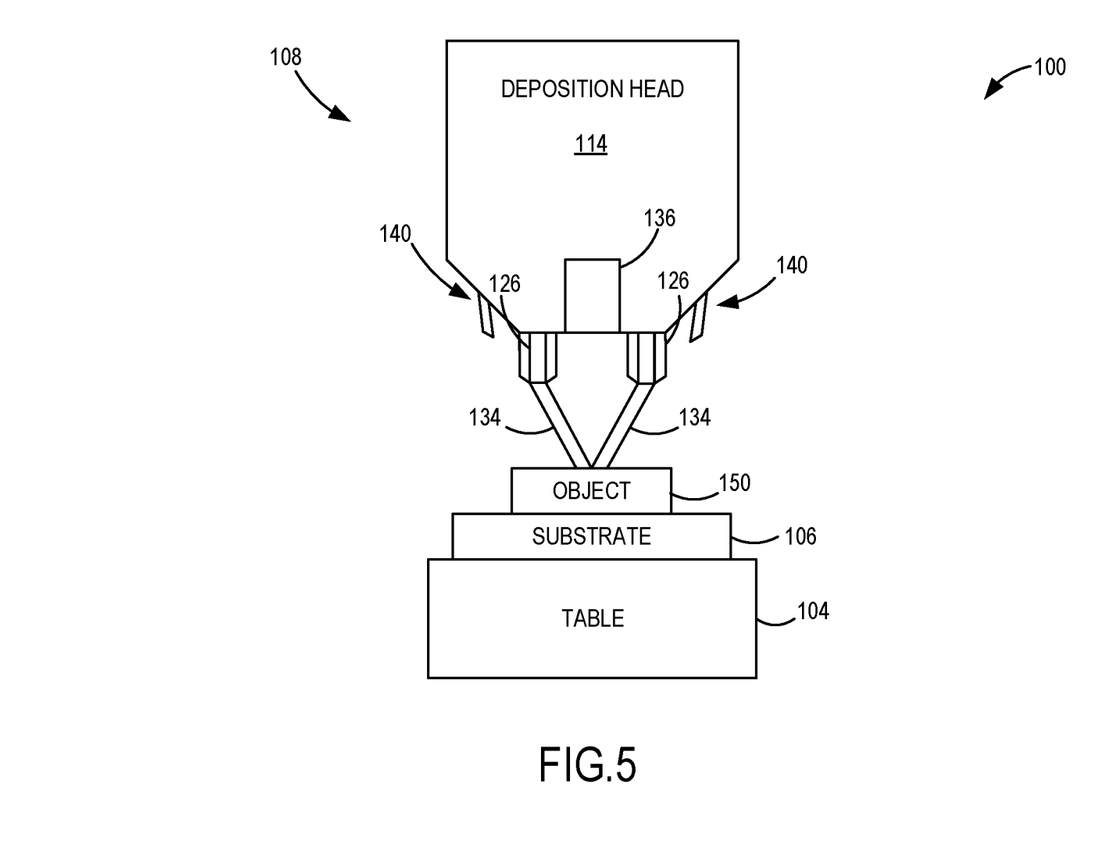
FIG. 5 is an enlarged schematic diagram of the deposition system shown in FIG. 2 illustrating an intermediary shot peening process according to an embodiment of the present disclosure.

In some examples, and referring now to FIG. 5, the shot peening process shown in FIG. 4 is used before the laser deposition process shown in FIG. 3 is complete. For example, exterior surfaces of the object 150 that will be unexposed or have limited exposure once the structure of the object 150 has been completely produced are shot peened by the laser deposition apparatus 100 before the structure of the object is completed by the laser deposition process. In other words, the laser deposition process is halted after the structure of the object 150 has been only partially completed. The exterior surfaces that will be unexposed or have limited exposure once the laser deposition process is complete is then shot peened by the laser deposition apparatus 100 before the laser deposition process is resumed to complete the structure of the object 150. In this manner, the laser deposition apparatus 100 alternates the shot peening process with the laser deposition process as needed during the build to surface treat exterior surfaces of the object 150 that can be difficult or impossible to shot peen once the structure of the object 150 is complete. FIG. 5 illustrates an intermediary shot peening process wherein the nozzles 126 of the deposition head 114 spray a stream of shot peen media 134 onto exterior surfaces of the partially completed structure of the object 150 shown in FIG. 3 between the deposition of two adjacent layers using the laser deposition process.

Figure 6:
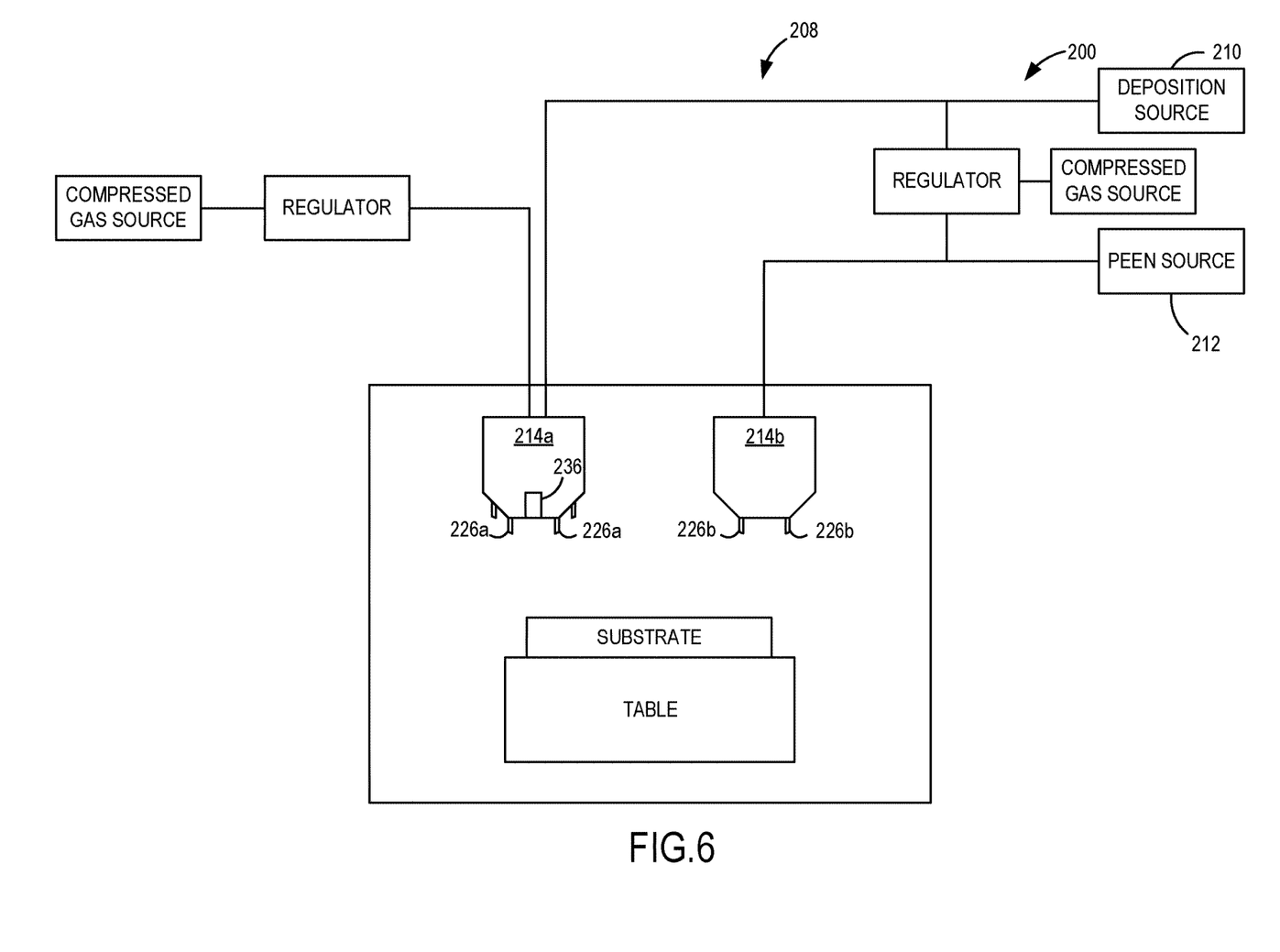
FIG. 6 is an enlarged schematic diagram of a laser deposition apparatus according to another embodiment of the present disclosure.

As described above, the illustrated embodiment of the laser deposition apparatus 100 includes the single deposition head 114 that performs both the laser deposition process and the shot peening process of the laser deposition apparatus 100, but examples wherein one or more deposition heads are dedicated for performing the laser deposition process and one or more deposition heads are dedicated for performing the shot peening process are contemplated by the present disclosure. That is, the laser deposition apparatus 100 can include any number of deposition heads 114. For example, FIG. 6 illustrates another embodiment of a laser deposition apparatus 200 that includes a deposition system 208 having two deposition heads 214a and 214b. The deposition head 214a includes a laser 236 and one or more nozzles 226a that are fluidly connected to a deposition source 210 such that the deposition head 214a is configured to spray a stream of powder material into a laser beam generated by the laser 236 to thereby perform a laser deposition process. In some examples, the laser beam generated by the laser 236 is a focused laser beam. The deposition head 214b includes one or more nozzles 226b that are fluidly connected to a peen source 212 such that the deposition head 214b is configured to spray a stream of shot peen media to thereby perform a shot peen process.

Although shown as being a component of the deposition head 214a, the laser 236 is a separate component of the laser deposition apparatus 200 that is positioned relative to the deposition head 214a such that the laser beam generated by the laser 236 is configured to receive a stream of powder material from the nozzles 226a in some examples. The deposition head 214a is referred to herein as a "first" deposition head, while the deposition head 214b is referred to herein as a "second" deposition head in various examples.

In some other examples, the deposition heads 214a and 214b are configured to be interchangeably mounted to the deposition system 208 for selectively switching between the laser deposition process and the shot peening process, respectively.

Figure 7:
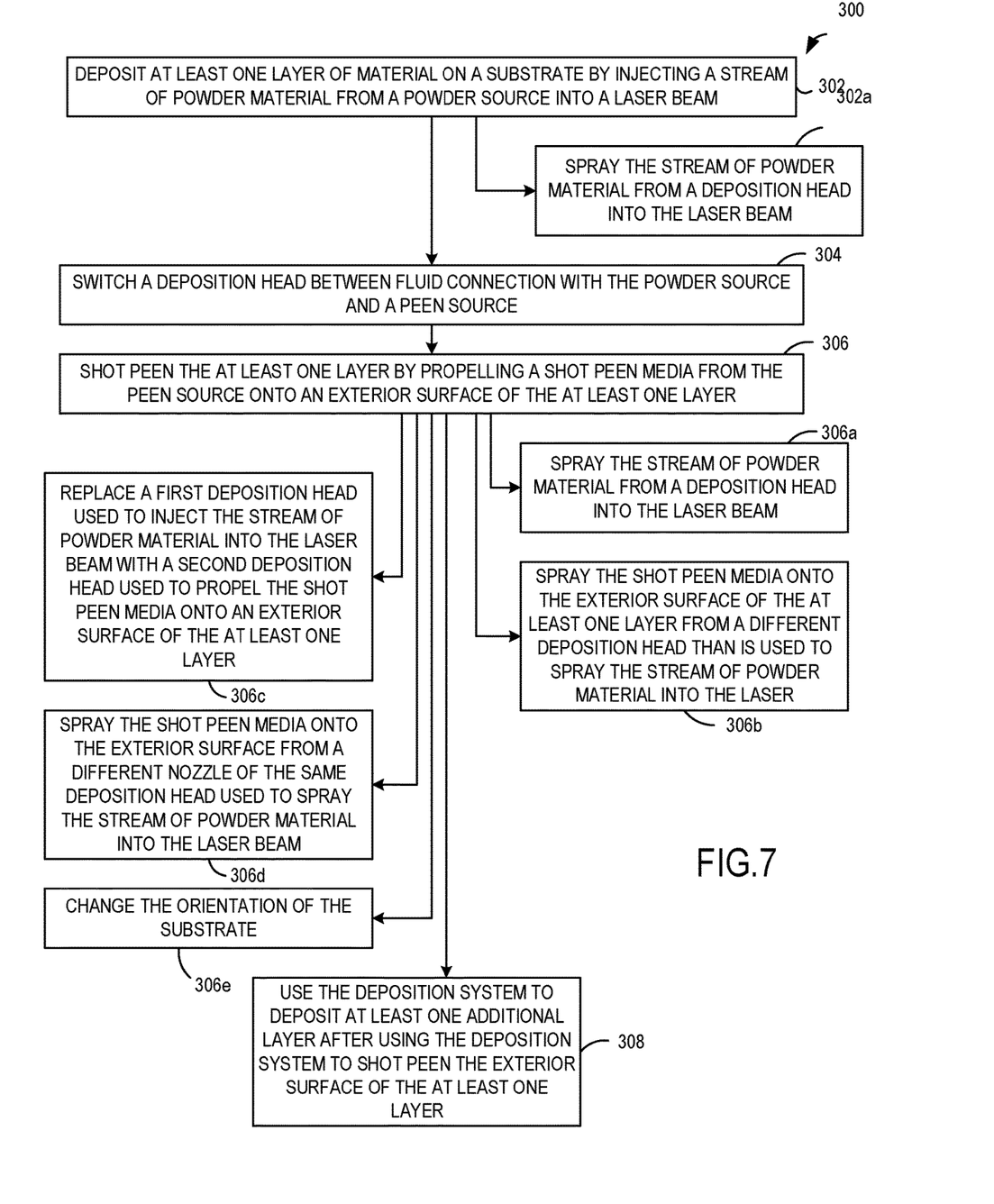
FIG. 7 is a flow chart illustrating a method for laser deposition according to an embodiment of the present disclosure.

FIG. 7 is a flow chart illustrating a method 300 for laser deposition according to an embodiment. At 302, the method 300 deposits at least one layer of material on a substrate by injecting a stream of powder material from a powder source into a laser beam using a deposition system that is connected to both the powder source and a peen source. Optionally, injecting the stream of powder material into the laser beam at 302 includes spraying, at 302a, the stream of powder material from a deposition head into the laser beam.

At 304, the method 300 switches a deposition head of the deposition system between fluid connection with the powder source and fluid connection with the peen source.

At 306, the method 300 shot peens the at least one layer by using the deposition system to propel a shot peen media from the peen source onto an exterior surface of the at least one layer. Optionally, propelling the shot peen media onto the exterior surface of the at least one layer at 304 includes spraying, at 306a, the shot peen media from a deposition head onto the exterior surface. In some examples, shot peening the at least one layer at 304 comprises spraying, at 306b, the shot peen media onto the exterior surface from a different deposition head than is used to spray the stream of power material into the laser beam at 302a. Optionally, shot peening the at least one layer at 306 includes replacing, at 306c, a first deposition head of the deposition system used to inject the stream of powder material into the laser beam at 302 with a second deposition head used to propel the shot peen media onto the exterior surface of the least one layer at 306. In one example, shot peening the at least one layer at 304 comprises spraying, at 306d, the shot peen media onto the exterior surface from a different nozzle of the same deposition head that is used to spray the stream of power material into the laser beam at 302a. Optionally, shot peening the at least one layer at 306 includes changing, at 306e, the orientation of the substrate.

At 308, the method 300 includes using the deposition system to deposit at least one additional layer after using the deposition system to shot peen at least a portion of the exterior surface of the at least one layer at 306.

Although the exemplary embodiments disclosed herein are directed to a powder fed laser deposition apparatus that is capable of performing a shot peening operation, the disclosure is not limited to a powder fed laser deposition apparatus. Rather, other additive manufacturing apparatus can be enabled to perform shot peening operations, for example, a powder bed fusion apparatus (e.g., a powder bed apparatus, a wire feed apparatus, etc.), a metal jetting apparatus, a directed energy deposition apparatus, etc.

Figure 8:
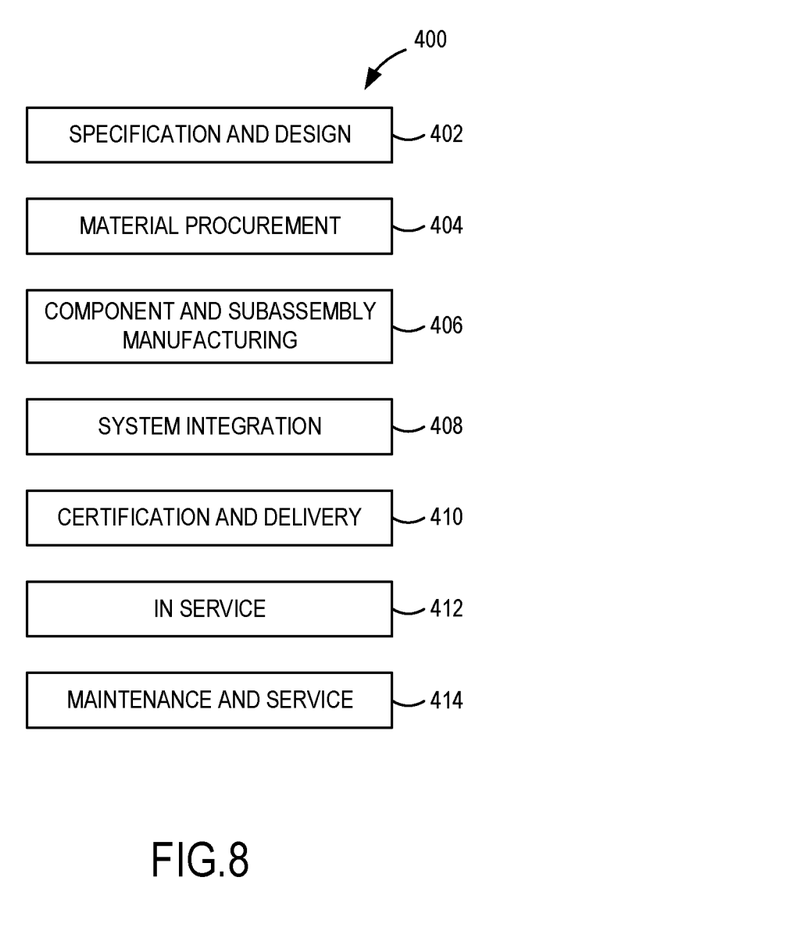
FIG. 8 is a block diagram of aircraft production and service methodology.
Figure 9:
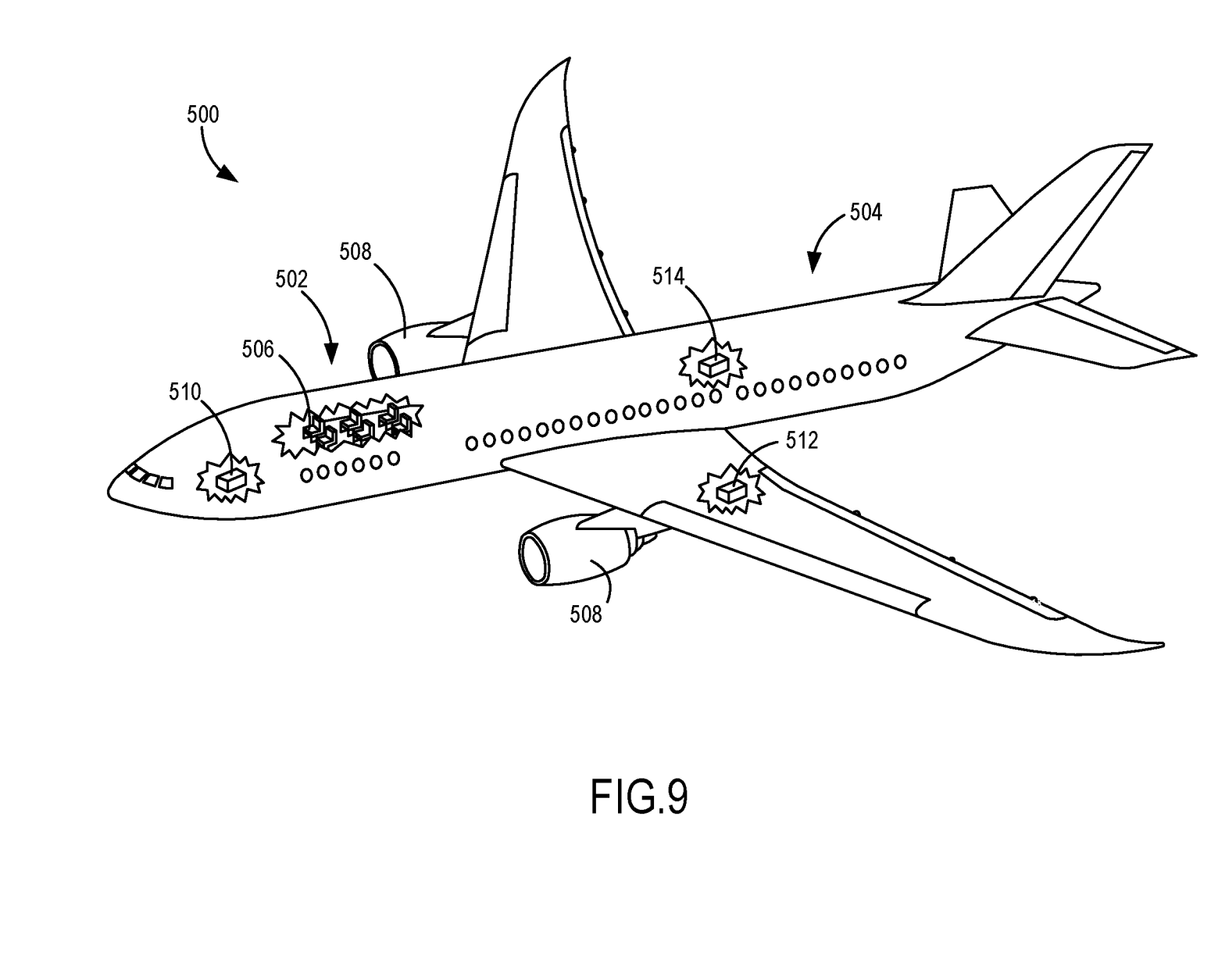
FIG. 9 is a schematic perspective view of an aircraft.

Examples of the disclosure may be described in the context of an aircraft manufacturing and service method 400 as shown in FIG. 8 and an aircraft 500 as shown in FIG. 9. During pre-production, illustrative method 400 may include specification and design 402 of the aircraft 500 and material procurement 404. During production, component and subassembly manufacturing 406 and system integration 408 of the aircraft 500 take place. Thereafter, the aircraft 500 may go through certification and delivery 410 to be placed in service 412. While in service by a customer, the aircraft 500 is scheduled for routine maintenance and service 414 (which may also include modification, reconfiguration, refurbishment, and so on).

Each of the processes of the illustrative method 400 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 9, the aircraft 500 produced by the illustrative method 400 may include an airframe 502 with a plurality of high-level systems 504 and an interior 506. Examples of high-level systems 504 include one or more of a propulsion system 508, an electrical system 510, a hydraulic system 512, and an environmental system 514. Any number of other systems may be included. Although an aerospace example is shown, the principles may be applied to other industries, such as the automotive industry.

Apparatus and methods shown or described herein may be employed during any one or more of the stages of the manufacturing and service method 400. For example, components or subassemblies corresponding to component and subassembly manufacturing 406 may be fabricated or manufactured in a manner similar to components or subassemblies produced while the aircraft 500 is in service. Also, one or more aspects of the apparatus, method, or combination thereof may be utilized during the production states 406 and 408, for example, by substantially expediting assembly of or reducing the cost of an aircraft 500. Similarly, one or more aspects of the apparatus or method realizations, or a combination thereof, may be utilized, for example and without limitation, while the aircraft 500 is in service, e.g., maintenance and service 414.

Thus, various embodiments include a laser deposition apparatus and method that selectively accesses a powder source configured to hold a powder material and a peen source configured to hold a shot peen media with a deposition system fluidly connected to the powder source and the peen source. The laser deposition apparatus and method allows for selectively depositing layers to form an object and peening the object without having to move the object between different devices to perform the layer deposition and the peening.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for laser deposition and peening.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The following clauses describe further aspects:

Clause Set A:

A1. A laser deposition apparatus comprising:
a sealed enclosure configured to hold a substrate;
a powder source configured to hold a powder material;
a peen source configured to hold a shot peen media; and
a deposition system fluidly connected to the powder source and the peen source, the deposition system comprising a laser configured to generate a laser beam, wherein the deposition system is configured to deposit at least one layer on the substrate by injecting a stream of the powder material into the laser beam, the deposition system being configured to shot peen the at least one layer by propelling the shot peen media onto an exterior surface of the at least one layer.

A2. The laser deposition apparatus of clause A1, wherein the deposition system further comprises a deposition head fluidly connected to the powder source and the peen source, the deposition head being configured to spray the stream of the powder material into the laser beam, the deposition head being configured to spray the shot peen media onto the exterior surface of the at least one layer.

A3. The laser deposition apparatus of clause A1, wherein the deposition system further comprises first and second deposition heads, the first deposition head being fluidly connected to the powder source and being configured to spray the stream of powder the material into the laser beam, the second deposition head being fluidly connected to the peen source and being configured to spray the shot peen media onto the exterior surface of the at least one layer.

A4. The laser deposition apparatus of clause A1, wherein the deposition system further comprises a deposition head fluidly connected to the powder source and the peen source, the deposition head comprising first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer.

A5. The laser deposition apparatus of clause A1, wherein the deposition system further comprises at least one valve configured to selectively switch the deposition system between fluid connection with the powder source and fluid connection with the peen source.

A6. The laser deposition apparatus of clause A1, wherein the deposition system further comprises a control gas subsystem configured to at least partially surround the stream of powder material with an inert gas.

A7. The laser deposition apparatus of clause A1, wherein the table is moveable such that the table is configured to change the orientation of the substrate.

Clause Set B:

B1. A method for laser deposition comprising:
depositing at least one layer of material on a substrate by injecting a stream of a powder material from a powder source into a laser beam using a deposition system that is connected to the powder source and is connected to a peen source; and
shot peening the at least one layer by using the deposition system to propel a shot peen media from the peen source onto an exterior surface of the at least one layer.

B2. The method of clause B1, wherein the deposition system comprises a deposition head, and wherein:
injecting the stream of the powder material into the laser beam comprises spraying the stream of the powder material from the deposition head into the laser beam; and
propelling the shot peen media onto the exterior surface of the at least one layer comprises spraying the shot peen media from the deposition head onto the exterior surface.

B3. The method of clause B1, wherein injecting the stream of the powder material into the laser beam comprises spraying the stream of the powder material from a deposition head into the laser beam, and wherein shot peening the at least one layer comprises spraying the shot peen media onto the exterior surface from a different deposition head.

B4. The method of clause B1 further comprising using the deposition system to deposit at least one additional layer after using the deposition system to shot peen the exterior surface of the at least one layer.

B5. The method of clause B1, wherein shot peening the at least one layer comprises replacing a first deposition head of the deposition system used to inject the stream of the powder material into the laser beam with a second deposition head used to propel the shot peen media onto the exterior surface of the least one layer.

B6. The method of clause B1, wherein injecting the stream of the powder material into the laser beam comprises spraying the stream of the powder material from a nozzle of a deposition head into the laser beam, and wherein shot peening the at least one layer comprises spraying the shot peen media onto the exterior surface of the at least one layer from a different nozzle of the deposition head.

B7. The method of clause B1 further comprising switching a deposition head of the deposition system between fluid connection with the powder source and fluid connection with the peen source.

B8. The method of clause B1, wherein shot peening the at least one layer comprises changing the orientation of the substrate.

Clause Set C:

C1. A deposition system comprising:
a laser configured to generate a laser beam; and
at least one deposition head configured to be fluidly connected to a powder source that contains a powder material and a peen source that contains a shot peen media, wherein the at least one deposition head is configured to deposit at least one layer of material by injecting a stream of the powder material from the powder source into the laser beam, the at least one deposition head being configured to shot peen the at least one layer by propelling the shot peen media from the peen source onto an exterior surface of the at least one layer.

C2. The deposition system of clause C1, wherein the deposition head comprises first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer.

C3. The deposition system of clause C1 further comprising at least one valve configured to selectively switch the at least one deposition head between fluid connection with the powder source and fluid connection with the peen source.

C4. The deposition system of clause C1 further comprising a control gas sub-system configured to surround the stream of the powder material and the laser beam with an inert gas for controlling injection of the stream of the powder material into the laser beam.

C5. The deposition system of clause C1, wherein the at least one deposition head comprises the laser.

What is claimed is:

1. A laser deposition apparatus comprising:
a sealed enclosure configured to hold a substrate;
a powder source configured to hold a powder material;
a peen source configured to hold a shot peen media; and
a deposition system fluidly connected to the powder source and the peen source, the deposition system comprising a deposition head fluidly connected to the powder source and the peen source, the deposition head comprising a laser configured to generate a laser beam, wherein the deposition head is configured to deposit at least one layer on the substrate using a laser deposition process that includes emitting the laser beam toward the substrate and injecting a stream of the powder material into the laser beam, the deposition head being further configured to shot peen the at least one layer by propelling the shot peen media onto an exterior surface of the at least one layer after the laser deposition process has been halted.

2. The laser deposition apparatus of claim 1, wherein the deposition head comprises first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer.

3. The laser deposition apparatus of claim 1, wherein the deposition system further comprises at least one valve configured to selectively switch the deposition system between fluid connection with the powder source and fluid connection with the peen source.

4. The laser deposition apparatus of claim 1, wherein the deposition system further comprises a control gas sub-system configured to at least partially surround the stream of the powder material with an inert gas.

5. The laser deposition apparatus of claim 1, wherein the table is moveable such that the table is configured to change an orientation of the substrate.

6. A method for laser deposition comprising:
depositing at least one layer of material on a substrate using a laser deposition process that includes emitting a laser beam toward the substrate and injecting a stream of a powder material from a powder source into the laser beam using a deposition head that is connected to the powder source and is connected to a peen source; and
shot peening the at least one layer of material by using the deposition head to propel a shot peen media from the peen source onto an exterior surface of the at least one layer of material after the laser deposition process has been halted.

7. The method of claim 6, wherein:
injecting the stream of the powder material into the laser beam comprises spraying the stream of the powder material from the deposition head into the laser beam; and
propelling the shot peen media onto the exterior surface of the at least one layer of material comprises spraying the shot peen media from the deposition head onto the exterior surface.

8. The method of claim 6, wherein injecting the stream of the powder material into the laser beam comprises spraying the stream of the powder material from the deposition head into the laser beam, and wherein shot peening the at least one layer of material comprises spraying the shot peen media onto the exterior surface from the deposition head.

9. The method of claim 6 further comprising using the deposition head to deposit at least one additional layer after using the deposition head to shot peen the exterior surface of the at least one layer of material.

10. The method of claim 6, wherein injecting the stream of the powder material into the laser beam comprises spraying the stream of the powder material from a nozzle of the deposition head into the laser beam, and wherein shot peening the at least one layer comprises spraying the shot peen media onto the exterior surface of the at least one layer of material from a different nozzle of the deposition head.

11. The method of claim 6 further comprising switching the deposition head between fluid connection with the powder source and fluid connection with the peen source.

12. The method of claim 6, wherein shot peening the at least one layer of material comprises changing an orientation of the substrate.

13. A laser deposition apparatus comprising:
a laser configured to generate a laser beam; and
a deposition head configured to be fluidly connected to a powder source that contains a powder material and a peen source that contains a shot peen media, the deposition head comprising the laser, wherein the deposition head is configured to deposit at least one layer of material using a laser deposition process that includes emitting the laser beam toward a substrate and injecting a stream of the powder material from the powder source into the laser beam, the deposition head being further configured to shot peen the at least one layer by propelling the shot peen media from the peen source onto an exterior surface of the at least one layer of material after the laser deposition process has been halted.

14. The laser deposition apparatus of claim 13, wherein the deposition head comprises first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer of material.

15. The laser deposition apparatus of claim 13 further comprising at least one valve configured to selectively switch the deposition head between fluid connection with the powder source and fluid connection with the peen source.

16. The laser deposition apparatus of claim 13 further comprising a control gas sub-system configured to surround the stream of the powder material and the laser beam with an inert gas for controlling injection of the stream of the powder material into the laser beam.

17. The laser deposition apparatus of claim 1, wherein the deposition head comprises a nozzle fluidly connected to the peen source and configured to spray the shot peen media onto the exterior surface of the at least one layer, the laser being held by the deposition head adjacent the nozzle.

18. The laser deposition apparatus of claim 1, wherein the deposition head comprises first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer, the laser being held by the deposition head between the first and second nozzles.

19. The laser deposition apparatus of claim 13, wherein the deposition head comprises a nozzle fluidly connected to the peen source and configured to spray the shot peen media onto the exterior surface of the at least one layer of material, the laser being held by the deposition head adjacent the nozzle.

20. The laser deposition apparatus of claim 1, wherein the deposition head comprises first and second nozzles, the first nozzle being fluidly connected to the powder source and configured to spray the stream of the powder material into the laser beam, the second nozzle being fluidly connected to the peen source and configured to spray the shot peen media onto the exterior surface of the at least one layer of material, the laser being held by the deposition head between the first and second nozzles.

* * * * *